United States Patent [19]

Koch

[11] Patent Number: 4,745,702
[45] Date of Patent: May 24, 1988

[54] WATER-WEIGHTED DIVER, SIDE PLANER, OR SIDE DIVER

[76] Inventor: Alexander W. Koch, P.O. Box 847, Winchester, Oreg. 97495

[21] Appl. No.: 923,620

[22] Filed: Dec. 4, 1986

[51] Int. Cl.⁴ .............................................. A01K 91/00
[52] U.S. Cl. ................................................ 43/43.13
[58] Field of Search ................ 43/9, 43.12, 43.13, 43/43.14, 43.15

[56] References Cited

U.S. PATENT DOCUMENTS

| | | |
|---|---|---|
| 1,635,294 | 7/1927 | Templer ................................ 43/9 |
| 2,247,583 | 7/1941 | Louthan ........................... 43/43.13 |
| 2,597,288 | 5/1986 | Caldwell . |
| 2,912,782 | 11/1959 | Maximov . |
| 2,942,371 | 6/1960 | Johnson et al. ................ 43/43.13 |
| 3,507,068 | 4/1970 | Roberts . |
| 3,543,431 | 12/1970 | Olds . |
| 3,760,762 | 9/1973 | Spongberg . |
| 3,818,624 | 6/1974 | Duffy . |
| 3,949,512 | 4/1976 | Stegemeyer . |
| 3,971,154 | 7/1976 | Craig . |
| 4,028,839 | 6/1977 | Stubblefield . |
| 4,028,840 | 6/1977 | Wille . |
| 4,138,793 | 2/1979 | Kellie . |
| 4,237,644 | 12/1980 | Hansen . |
| 4,461,115 | 7/1984 | Carrillo . |
| 4,486,970 | 12/1984 | Larson . |
| 4,524,538 | 6/1985 | Halvorsen ...................... 43/43.13 |
| 4,646,463 | 3/1987 | Koch .............................. 43/43.13 |

Primary Examiner—M. Jordan
Attorney, Agent, or Firm—Eugene M. Eckelman

[57] ABSTRACT

A basic unit is capable of use by itself as a depth control device and has attachments capable of converting it to a side planer or to a side diver. The basic unit has an association of angled surfaces thereon and side fins which provides efficient operation with minimum wobble or drag on the fishing pole. A line stop can be used with the device to hold it in place on a line but to release the device when a fish takes the hook.

15 Claims, 2 Drawing Sheets

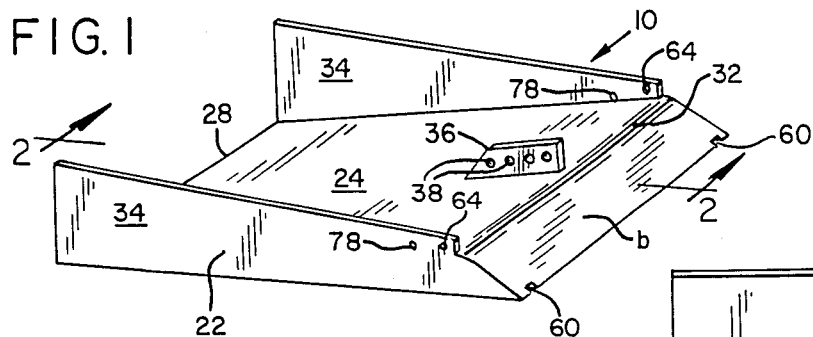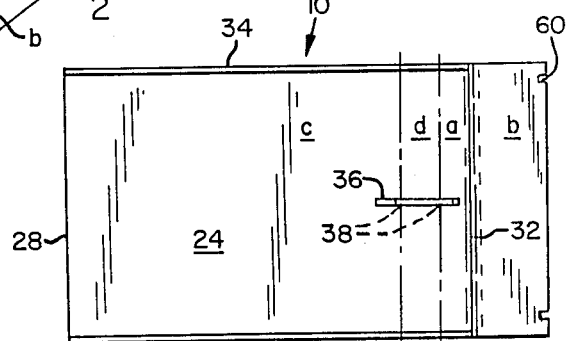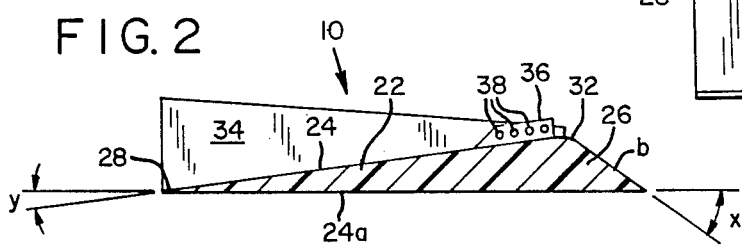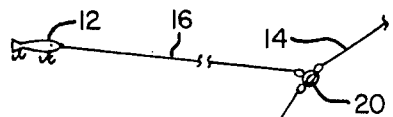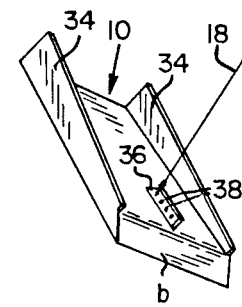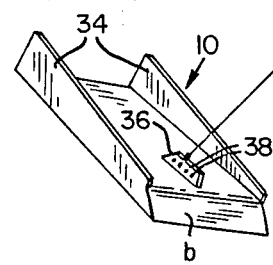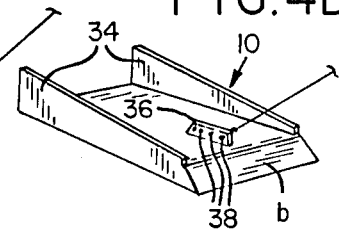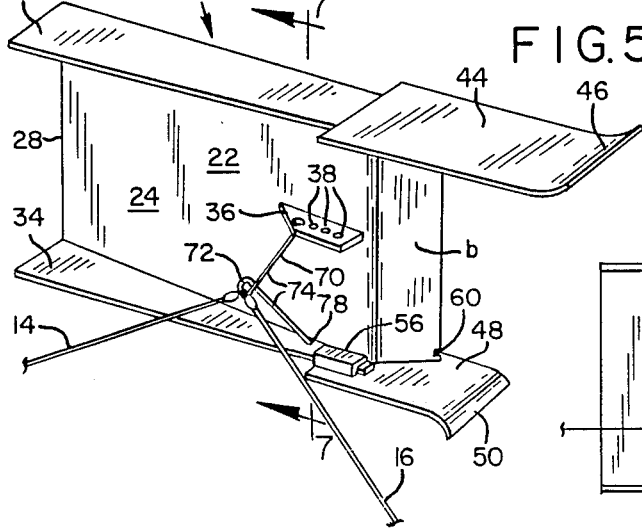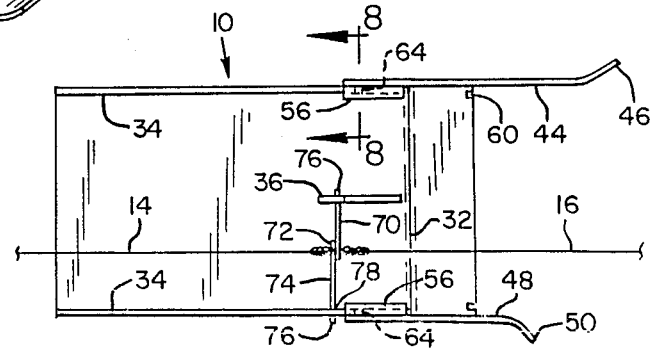

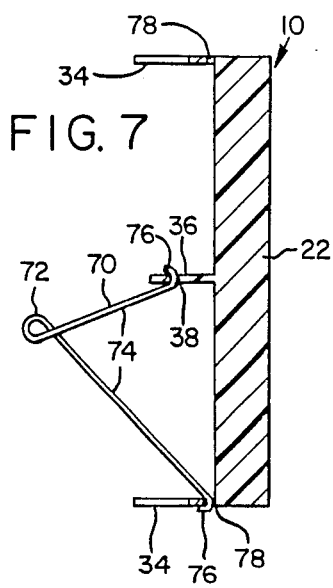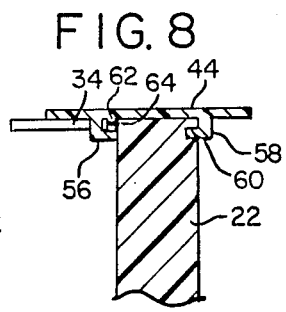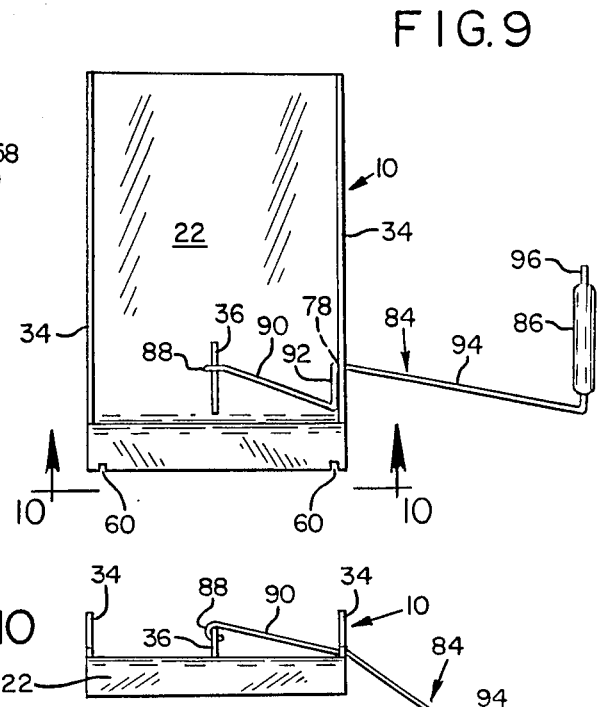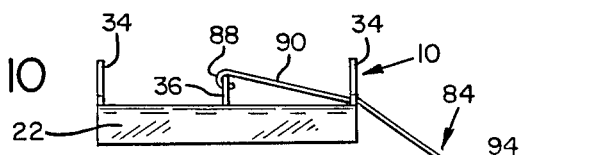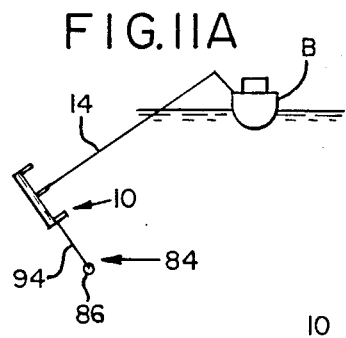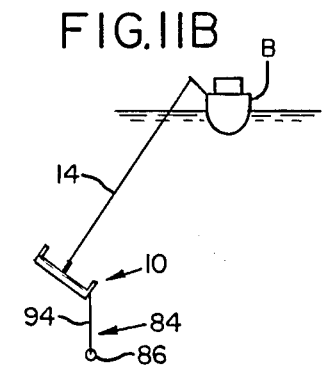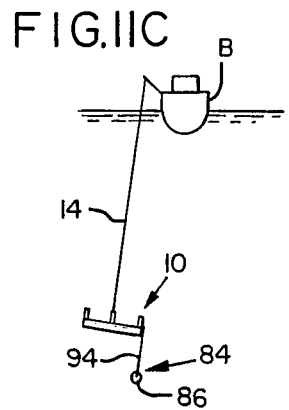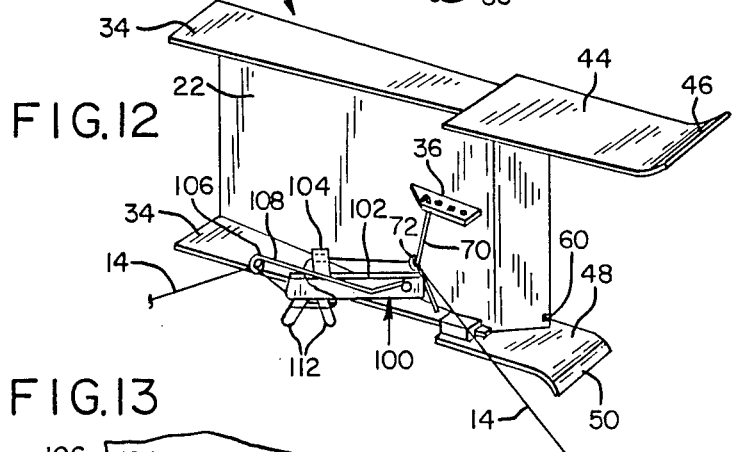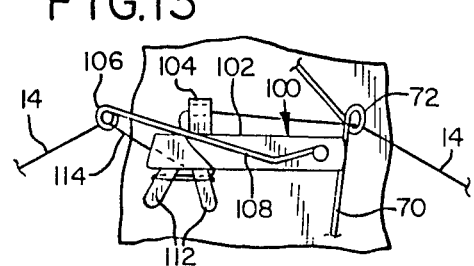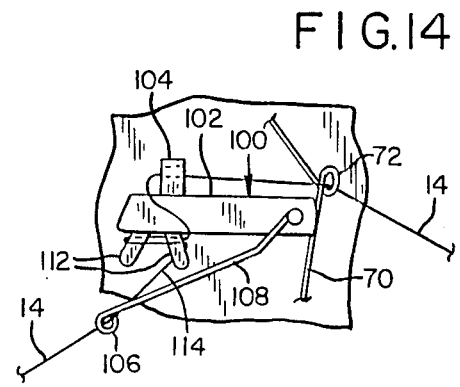

WATER-WEIGHTED DIVER, SIDE PLANER, OR SIDE DIVER

BACKGROUND OF THE INVENTION

This invention relates to new and useful improvements in diving/planing devices of the type that are arranged to move a fish lure or bait to selected positions in the water while trolling from a boat or while fishing in a current.

Devices have heretofore been employed for moving a fish lure to selected positions relative to the fisherman, such as depth control or diving devices or side planing devices. Some of such devices use weights for setting the angle, or depth of movement in the water, but such results in only one efficient reaction speed relative to water pressure/weight such as a trolling or current speed, the term water pressure/weight being defined as the reaction forces of water and the weight thereof on areas of the diving/planing device. When this water pressure/weight is less than the designed speed of the device, proper functioning of the latter does not occur, and when this water pressure/weight is greater, there is excessive drag and wobbling in the water. This drag and/or wobbling causes excessive tension on the fish line. The weight also causes drag and turbulence which obviously interferes with the diving or planing capabilities. Floating devices have been used which employ hollow chambers to set the diving angle. This also results in only one efficient trolling speed and causes the same disadvantages as the weighted diver.

A further disadvantage of some prior planing devices is that the trolling or current speed will affect the diving or planing distance. For example, weighted devices go deeper at slow speeds than at fast speeds. On the other hand, devices that have angled surfaces frequently tend to go deeper at fast speeds.

Still a further disadvantage of previous diving and planing/devices is that they are not stable in the water and do not efficiently use the water pressure/weight for the intended purpose; also, some devices connect the lure or bait line to the body portion thereof and this interferes with its action.

SUMMARY OF THE INVENTION

According to the present invention and forming a primary objective thereof, a device is provided that includes concepts of structure that overcome disadvantages of prior diving and planing devices.

Another object is to provide a device employing a basic body member or unit capable of use in a diving mode and also capable, with attachments readily connected to said body member, of use in a side planing mode or a side diving mode.

A more particular object is to provide a diving/planing device that has a novel arrangement of angled surfaces and line connect means that accomplish most efficient diving or planing functions with minimum drag and wobble.

A more particular object is to provide a device of the type described which uses its entire surface to contribute to diving or planing forces without causing water turbulence; more particularly, such surfaces comprise a front angled surface and interrelated body surfaces all combined in their function with adjustable line connecting points for accomplishing selected trolling speeds with minimum drag on the fish pole.

Another object is to provide a diving/planing device that employs side fins instrumental in the action thereof in that such fins trap and prevent loss of water energy flowing over the sides of the device in the diving mode and also provide horizontal stability in a side planing mode.

Another object is to provide a line stop structure having novel means for holding a diving or planing device at a selected position on a fish line before a fish is hooked but allowing the device to slide down the line when the fish is hooked.

In carrying out the objectives of the invention, the present diving/planing device has a basic plate-like body member including a straight first or top surface and a straight second or bottom surface, the first surface being tapered or angled to a thinned rearward end with relation to the second surface. The front of the body member is tapered or angled and a line connecting tab is integrated with the body member adjacent the front. Upright fins extend along the sides and prevent water loss over the sides of the device. The line connecting tab is provided adjacent the front of the first surface rearwardly of the front angled surface and has a plurality of line connecting apertures, whereby the positioning of the line at the connecting tab in combination with area dimensions of the first surface of the body member and the tapered front edge, and also in combination with the side fins, all combine to provide controlled efficiency diving or planing. The basic concept of the present device can be employed as a diver for depth control, a side planer for lateral planing, and a side diver for keeping pole lines apart by the addition of auxiliary means. The present device is arranged for use with a line stop designed to position it in operative location on the line but to release the device so that it will slide down the line when a fish is hooked.

The invention will be better understood and additional objects and advantages will become apparent from the following description taken in connection with the accompanying drawings.

BRIEF DESCRIPTION OF THE DRAWINGS

FIG. 1 is a perspective view of a basic body member or unit of the invention;

FIG. 2 is a longitudinal sectional view taken on the line 2—2 of FIG. 1;

FIG. 3 is a top plan view of the device of FIG. 1;

FIGS. 4A, 4B, 4C, and 4D are diagrammatic perspective views showing various diving positions as controlled by varying the line attach points.

FIG. 5 is a perspective view of a side planing device using the basic unit of the invention with attachments;

FIG. 6 is a side elevational view of the device of FIG. 5;

FIG. 7 is an enlarged vertical section view taken on the line 7—7 of FIG. 5;

FIG. 8 is an enlarged vertical fragmentary section view taken on the line 8—8 of FIG. 6;

FIG. 9 is a top plan view of a side diving device using the basic unit of the invention with attachments;

FIG. 10 is an end elevational view taken on the line 10—10 of FIG. 9;

FIGS. 11A, 11B, and 11C are diagrammatic elevational views showing functions of the side diving device of FIG. 9;

FIG. 12 is a perspective view of the side planer of FIG. 5 combined with a line stop device;

FIG. 13 is a side elevational view of the line stop in a stop position; and

FIG. 14 is a side elevational view of the line stop in a releasing position.

DETAILED DESCRIPTION OF PREFERRED EMBODIMENTS

With reference first to FIGS. 1 through 4, a basic structure or unit 10 of the invention is shown which is capable of use in a depth control device or diver, a side planer or a side diver. This unit as is can be used as a depth control diver for moving a lure or bait 12 to a desired submerged distance. A pole line is designated by the numeral 14, FIG. 4A, and the bait line or leader is designated by the numeral 16. The pole line 14 may extend directly to the diver, if desired, although it is preferred that an auxiliary line or leader 18 extend from an interconnecting swivel 20 to which the bait line is also connected. A feature of the present device is that it is not materially affected in its operation by the lure or bait line 16 since the latter is not connected to it but rather is connected directly to the pole line in spaced relation from the device.

The unit 10 comprises a plate-like body member 22 having a straight first or top surface 24 and a straight second or bottom surface 24a. The body member is tapered or thinned toward the rear, as best seen in FIG. 2, having a thickened front end portion 26 and a thin rearward or tail end 28 where the first and second surfaces meet. A front end surface b of the body member is angled rearwardly toward the top surface and has a rounded top edge or crown 32. Upright fins 34 extend along the sides starting at about the front edge 32 and lead fully to the rearward end 28. These fins are of tapered height, forming a deepening trough toward the rear due to their taper and to the angled top surface 24.

An integral line connecting tab 36 is disposed on the upper surface of the body member in a central position from side to side and spaced closely adjacent the top edge 32. Line connecting tab 36 has a plurality of apertures 38 spaced along its length for selected connection of the line 18 thereto. In a preferred arrangement, the diver/planer has a specific gravity slightly less than water, such as 0.8, so that it will float when not moving in water. The angle of the surface b with relation to the bottom surface 24a of the body portion, as designated by x in FIG. 2, is approximately 34 degrees, and the angle of the taper of the top surface 24 also relative to the bottom surface of the body portion, as designated by y is approximately 7 degrees. For a purpose to be described, surface 24 of the body portion 22 is divided into three areas, FIG. 3, defined by phantom lines, comprising area a extending from the rounded edge 32 to the forwardmost aperture 38 in the line connecting tab, area d extending between the forwardmost aperture 38 to the rearwardmost aperture 38 and the area c extending between the rearwardmost aperture 38 and the rearward or tail end 28 of the body portion.

The particular areas of the surfaces b, a, d, and c and the angular relationship of area b and the latter three accomplish a novel action of the present device. To accomplish this action, the diver must have a surface area aft of the attach point relative to the front of the attach point that is approximately 3 or 4 to 1 in area. Also, the total area of the surface aft of the crown relative to angled surface b is approximately 7 to 1.

The key to this solid floating diver being able to dive and stay down, without any flotation chambers or weights to set a diving angle, is the angle of the upper two surfaces of the body member and the bottom flat surface. This design creates a differential pressure between the upper two surfaces for each attach point of the line, thereby setting the most efficient diving angle for a desired trolling speed. If the upper surface of the solid diver body were not angled or if it were curved, one flat or three or more sided, the diver would not stay down in a trolling mode but would climb to the water surface unless, of course, a flotation chamber or weight is incorporated to set the diving angle. At rest, the diver will nose up if attached at any of the line attach holed because most of its weight is to the rear of the attach point.

In motion, the water pressure on the forward angled surface b equates into water weight which causes the diver to tip nose down to a diving attitude. And in effect, the pressure/weight on surface area b exceeds the pressure/weight on combined surfaces a, d, and c. Therefore, unlike other divers which use weights or flotation chambers to set the diving angle, this diver uses water pressure/weight to set the diving angle.

OPERATION

FIGS. 4A, 4B, 4C, and 4D show various angled depth control positions as accomplished by selected attachment of the line 18 to line connecting tab 36. As an example and with reference to FIG. 4A, when the fishing line is attached to the rear attach point 38, the forwardmost angled surface b is close to flush (90 degrees) to the water flow against the surface. In this position, the water pressure/weight per square centimeter is close to twice the pressure/weight per square centimeter on surfaces a, d, and c. Consequently, area b becomes the weighted portion of the planer/diver as noted above in lieu of using an external weight to assist in setting the diving angle. This relationship gives the body portion a rather severe angled position for depth control at a very slow speed. When the fishing line is attached to the forward attach point, FIG. 4D, the forwardmost angled surface b is approximately 34 degrees to the water flow against the surface. Consequently, the water pressure/weight per square centimeter is less but still exceeds the pressure per square centimeter on the surfaces a, c, and d and the body member has only a slight angled position for very fast trolling. The intermediate positions shown in FIGS. 4B and 4C maintain angles of dive in between those shown in FIGS. 4A and 4D, and, similar to the latter dive positions, accomplish an efficient depth according to a selected speed with minimum drag and substantially no wobble. The angular positioning of the body member 22 in FIG. 4B, as controlled by the attachment line 18 to the aperture next forward of the rearwardmost aperture, is for trolling at a faster speed than shown in FIG. 4A, and attachment of the line 18 to the next forward aperture is for a faster speed yet. Attachment of the line to the front aperture is for trolling at a very fast speed. Thus, in the use of four attachment holes as an example, FIG. 4A represents a very slow speed, FIG. 4B a slow trolling speed, FIG. 4C a fast trolling speed, and FIG. 4D a very fast trolling speed.

In all cases, the angle of the surface b is large enough, in combination with the forward pull on the tab 36, to cause the water pressure/weight on this surface to be greater than the water pressure/weight on the entire surfaces a, d, and c when the planer is towed through the water, whereby to cause the angular depth control position. Thus, even though the area forward of an attached point is less than aft of such attached point, the water pressure of surface b and areas forward of the attach point, such as areas a and d, in combination with the forward pull, overcomes the water pressure of rear surfaces, such as surface c, to provide an angle of dive.

In general, areas a and b become less and areas c and d become larger as the attach point is moved forward. The diver thus balances itself in conjunction with the attach point and changes the diving angle for a faster trolling speed as the attach point is moved forward without causing turbulence and wobbling.

The diver thus can be adjusted to the most efficient diving angle for a particular trolling speed from very slow to very fast. In other words, the angle of dive is set by the fisherman according to the speed that he wishes to troll, and once this angle is set by means of the proper attach point, the diver will operate without causing turbulence and without wobbling and thus a minimun of drag occurs on the fish pole. As stated, the lure or bait line 16 is attached to the pole line and not to the diver. Thus, the lure and line 16 do not interfere with the balance and dive characteristics of the diver. The device is made from a solid piece of material without the addition of weights or floats and thus is readily molded or otherwise formed inexpensively.

With reference to FIGS. 5, 6 and 7, the basic unit of the invention as shown in FIG. 1 can be adapted for use as a side planer, namely, when fishing from a boat for trolling or from a stream bank in a current, the device can be used to carry the bait laterally. The basic unit 10 has the same tapered body member 22 with the tapered front end b and side fins 34. The device employs similar planing areas and characteristics as described in connection with the FIG. 1 embodiment, except it operates on edge.

Attachments are provided to make this basic unit a side planer. A first attachment comprises an elongated ski 44 attached as a forward extension to one side, which is now the top. Ski 44 has a turned up end portion 46. A shortened narrow ski 48 is attached at the other side which is now the bottom. This ski has a turned down end 50. In addition to being longer than ski 48, ski 44 is wider. These skis are secured in place by convenient attach and detach means. As an example, the inside surfaces of these skis have inturned angled tabs 56 and 58, as best seen in FIG. 8, the tab 56 fitting over and behind the adjacent fin 34 and the tab 58 fitting in a longitudinal groove 60 provided in the opposite surface of the body member 22. The skis are held in place by snap-indents 62 thereon engageable when fully installed with selectively located apertures 64 in the fins 34. With this structure, the fins can be readily mounted in place when the device is to be used as a side planer or removed when the device is to be used as a diver.

Connection of the side planer to the pole line is accomplished by a wire connector 70 having a line connecting loop 72 formed with reversely extending legs 74. Legs 74 have end hooks 76 one of which is removably connected to tab 36 and the other of which is removably engaged in an aperture 78 in the adjacent fin 34. The connector 70 is formed of wire of sufficient structure to withstand the tension of side planing and to provide hook engagement of hooks 76 and at the same time has sufficient resilence to allow the hooks 76 to be forced manually into and out of their respective apertures for attachment and detachment. The hook engagement of the connector with the body member 22 allows pivotal movement therebetween.

As best viewed in FIG. 7, the legs 74 have a length relationship such that the loop 70 is in a plane lower than the line connecting tab 36. As will be more apparent hereafter, this stabilizes the planer against rolling in the water.

In operation, the side planer will plane sideways at an angle determined by the position of attachment of the line, similar to the diving action of FIG. 1, except of course with the body member disposed in a vertical plane. It skims in partially submerged relation along the water with the enlarged top long ski 44 riding on the surface and the smaller short ski 48, with its turned down end 50, holding the device partially submerged. With the line attach point disposed an equal distance between the top and bottom the device is more or less stable in the water. Water conditions are not always smooth, and the device may tend to roll over in the water in choppy water. The wire connector 70 prevents this roll over action in that when the upper half of the device is out of the water and the water pressure on the lower half tends to roll it toward the pole line, the lower arm 74 is tensioned and the device cannot roll. Thus, in smooth water, tension of the pole line extends to the upper arm 74 but in the tendency to roll in rough water, the tension of the pole line extends to the lower arm. The lowered disposition of the loop 72 relative to attach point 36 assists in preventing this roll over away from the line.

The overall density of the unit with attachments is still preferably one that is slightly less than water, namely, about 0.8. This density causes the upper ski to plane on the surface of the water and sometimes slightly rise out of the water. The lower ski holds the device mostly submerged. The 0.8 density causes virtually all of the water forces impacting the planer body to be converted to side planing forces. Although the planer can be of a density of 1.0 or greater, in which case the lower ski is not needed to hold the device mostly submerged such a density is not as desirable as the density which is less than water because the submerged planer will cause more drag and be less efficient.

The side planer can be reversed from one side planing movement to the other by switching the skis and the wire connector.

The basic unit of the invention can be used as a side diver as well. With reference to FIGS. 9-11C, the basic unit 10 can be provided with a keel member 84 consisting of a shaped wire arranged to hold a weight 86 in spaced relation from the body member 22 and bendable to provide different side diving attitudes. This wire comprises a hook end 88 arranged for releasable attachment to the line connecting tab 36, a segment 90 extending obliquely in a lateral direction, a bend forming a longitudinal segment 92 which lies along an inside surface of a fin 34 to stabilize the keel, a bend forming on elongated segment 94 which passes through the aperture 78 in the fin and which extends laterally, and a bend forming a rearwardly extending segment 96 on which the weight 86 is attached. Weight 86 may comprise a pencil lead weight of the usual type having a central bore and arranged for easy mounting and crimping in place on segment 96. Selected lengths of the pencil lead may be used for varying the hanging weight.

With reference to FIGS. 11A, 11B, and 11C, the keel member 84 can be bent to obtain selected side diving attitudes. With reference to FIG. 11A, with the wire segment 96 bent straight out in alignment with the bottom surface of the body member, the hanging weight thereof will angle the diver such that in its diving action it works over to a maximum lateral distance from a trolling boat B. When the wire is bent down obliquely relative to the bottom surface, the diver trolls at a medium distance laterally of the boat. When the wire is bent straight down at right angles to the bottom surface, the diver trolls in a path substantially in line with the boat. Other locations of the keel member in between those mentioned can be provided depending upon the lateral position of the diver desired.

By means of such structure, settings of the keel member can be made such that multiple pole lines on a boat will not be in line with each other and thus the tangling of lines will be minimized. The keel member is capable of attachment to either side of the body member for controlling the path of the diver on either or both sides of a boat and can be detached entirely if the basic unit is to be used for the other purposes.

In accordance with the invention, a diver, side planer or side diver is provided that has a novel and cooperating arrangement of reaction surfaces, as well as water trapping side fins, that accomplish selected speed settings of troll or water movement. In each setting, the device operates with minimum drag and wobble. The simplicity of construction makes the device easy to manufacture such as by molding from plastic.

The design of the diver/planer comprising the total density thereof with keel weight, or the side planer with skis which always is preferably less than 1.0, allows the diver/planer to float in any of its configurations when not moving. Consequently the gravity effects on this device are minimal when it is moving in water. The diver/planer is extremely sensitive to small changes in configuration. The dominant force on the device is water weight/pressure on the upper forward angled surface when in motion. Thus, the reactionary thrust is always 90 degrees to the forward leading edge b. These characteristics of the device enable a small addition, such as a small weight in the side diving mode to change the attitude of the diver to any angle resulting in a change in the direction of thrust and dive attitude. Even a small ski with less than ¼ inch frontal surface installed on one side will cause the device in the side planing mode to swing to the surface.

It may be desirable that the diver or planer be released from its line connected position when a fish is hooked so that it can slide down the line and be inoperative. For this purpose a line stop 100, FIGS. 12, 13 and 14, is employed that is arranged to hold the device at a selected distance from the bait but which will allow it to slide down when a fish pulls on the bait. For this purpose, the pole or leader line 14 passes freely through an aperture of the line attaching means 36 of the FIG. 1 embodiment, or the connector eye 72 of the FIG. 5 assembly and the line stop 100 in its operation functions at a point between the present device and the bait, as illustrated in FIG. 12.

The line stop is illustrated in combination with the side planer of FIG. 5 but is capable of use with any type of device. It includes a body portion 102 having a closed eye 104 projecting from one surface thereof at one end and arranged slidably to receive the line 14. The line also has free sliding movement through an end eye 106 of a spring finger 108 secured integrally at its other end to a side of the body portion 102 and at the opposite end portion from the eye 104. Spring finger 108 is secured selectively in a position on the body portion and contoured such that the eye 106 thereof normally is positioned in a longitudinal plane close to the eye 104. On the opposite surface of the body portion 102 from the eye 104 and at the same end as this eye is a pair of integral diverging posts 112.

In the operation of the stop, it is placed on the line 14 on the bait side of the device with the line extending through both of the eyes 104 and 106. With reference to FIG. 13, a line portion 114 between the two eyes 104 and 106 is pulled through the eye 106 and wrapped two or three times around the posts 112. The opposite ends of the line 14 are then pulled outwardly with the fingers to take up any slack. The flexing strength of the spring finger 108 holds it up in the plane of the eye 104 and away from the posts 112. This position of the springfinger holds the line in wrapped position on the posts and in connected non-sliding relation on the stop, including operating conditions of the stop. When a fish strikes, however, the forceful tug on the line will flex the finger 108 away from the eye 104 and toward the end of the posts 112. This will allow the line to slip off the posts, as is occurring in FIG. 14, whereby the stop now has free movement on the line and it, as well as the planer, can slide freely to the bait. The planer is thus rendered ineffective and in addition the resistance causes a quick tiring of the fish.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A fishing device capable of use as any one of a depth control device, a side planer, and side diver, comprising a basic unit capable of use as said depth control device.

said basic unit including a plate-like body member having forward and rearward ends, a first surface tapered to a thinned rearward end at a second surface, the front of said body member being tapered rearwardly from said second surface to said first surface, a line connecting tab on the first surface of said body member adjacent the front of the latter, said tapered front end and said first surface cooperating in combination with said line connecting tab for forming reaction areas when engaged by water pressure/weight to cause said body member to travel angularly relative to the direction of water pressure/weight, means removably attachable to said body member when converting said basic unit to a side planer, and means removably attachable to said body member when converting said basic unit to a side diver.

2. A releasable line stop for holding fishing devices a selected position on a pole line, said stop comprising a body portion having opposite ends and defining surfaces, line guide means adjacent one end of said body portion arranged slidably to receive a pole line, line anchor posts adjacent said one end of said body portion but on an opposite surface arranged to receive a portion of a pole line in wrapped relation for supporting the line stop on the line, and a spring finger having opposite ends, one end of said finger being secure integrally to said body portion at the end opposite from said line guide means and said posts, the other end of said spring finger having line guide means also slidably receiving the fish line and being normally disposed in the plane of said line guide means, said spring finger being arranged to flex away from said line guide means to the plane of said anchor posts for causing line wrapped on said posts to disengage therefrom when the pull of a fish flexes said finger to the plane of said anchor posts and to allow said stop to slide on the line.

3. A fishing side planing device comprising an upstanding plate-like body member having forward and rearward ends, said body member including straight first and second side surfaces tapered to a thinned rearward end relative to said second side surface, the front of said body member being tapered rearwardly from said second side surface to said first side surface, a line connecting tab on the first side surface of said body member adjacent the front of the latter, said tapered front end and said first side surface cooperating in combination with said line connecting tab for forming reaction areas when engaged by water pressure/weight to cause said body member to travel angularly relative to the direction of water flow, a forward extension on one of said longitudinal fins having a turned up end portion, said extension forming a ski for maintaining said body members at the water surface in upright edge relation for side planing, and a forward extension on the other longitudinal fin having a turned down end poriton, the last mentioned extension forming a ski for holding said body member in the water at the surface thereof.

4. An unweighted diving device comprising a plate-like body member having forward and rearward ends and having a sepcific gravity less than water, said body member including a thickened forward portion formed by straight first and second surfaces with said first surface being angled downwardly to a thin rearward end meeting with said second surface, the forward end of said body member comprising a surface extending at an upward and rearward angle from said second surface to said first surface, and line connecting means on the first surface of said body member adjacent the front of the latter, said tapered front end surface and said first and second surfaces cooperating in combination with the pull from a line connected to said line connecting means for forming reaction areas when engaged by water pressure/weight to cause said body member to travel angularly under water in a diving action.

5. The fishing device of claim 4 wherein said body member has a longitudinal fin on each side projecting angularly upwardly from said first surface for forming a confining trough for flowing water reacting on the first surface of said body member.

6. The fishing device of claim 4 wherein said line connecting means is disposed adjacent said front tapered surface and includes a plurality of line connected apertures which are disposed in spaced relation from front to rear and which upon selected connected engagement with a line provides selected cooperation of water pressure/weight on said first and second surfaces and said tapered front end to vary the depth of dive of said device.

7. The fishing device of claim 4 wherein the ratio in area of said first surface relative to the area of said tapered front surface of said body portion is approximately 7 to 1.

8. The fishing device of claim 4 wherein the angle at which said first and second surfaces meet rearwardly is approximately seven degrees and the angle at which said forward surface meets with said second surface at the front is approximately thirty-four degrees.

9. The fishing device of claim 4 including a weighted keel member on one side of said body member providing side planing of said device as it dives.

10. The fishing device of claim 9 wherein said keel member is adjustable angularly on said body member to control the extent of side planing as it dives.

11. The fishing device of claim 9 wherein said keel member is detachably secured to said body member.

12. A dividing/planing device comprising a plate-like body member having forward and rearward ends, said body member including straight first and second surfaces with said first surface tapered to a thinned rearward end at said second surface, the front of said body member being tapered rearwardly from said second surface to said first surface, a line connecting tab on the first surface of said body member adjacent the front of the latter, said tapered front end surface and said first and second surfaces cooperating in combination with said line connecting tab for forming reaction areas when engaged by water pressure/weight to cause said body member to travel angularly relative to the direction of water pressure/weight, a longitudinal fin on each side of said body member projecting angularly from said first surface, and a forward extension of one of said longitudinal fins having an angled end portion, said extension forming a ski for maintaining said body member at the water surface in edge relation for side planing.

13. The fishing device of claim 12 including line connecting means attached to said line connecting tab and arranged to be connected to a fish line, said line connecting means including a connector having one leg portion connected to said line connecting tab and another leg connected to one side of said body member, said leg portions being pivotally connected to said line connecting means and said body member.

14. The fishing device of claim 12 including a forward extension on the other longitudinal fin having a turned down end portion, the last mentioned extension forming a ski for holding said body member in the water at the surface thereof.

15. The fishing device of claim 14 wherein said two forward extensions are detachably engaged with said body member for converting said device from a diver to a side planer or vice versa.

* * * * *